Patented Dec. 5, 1950

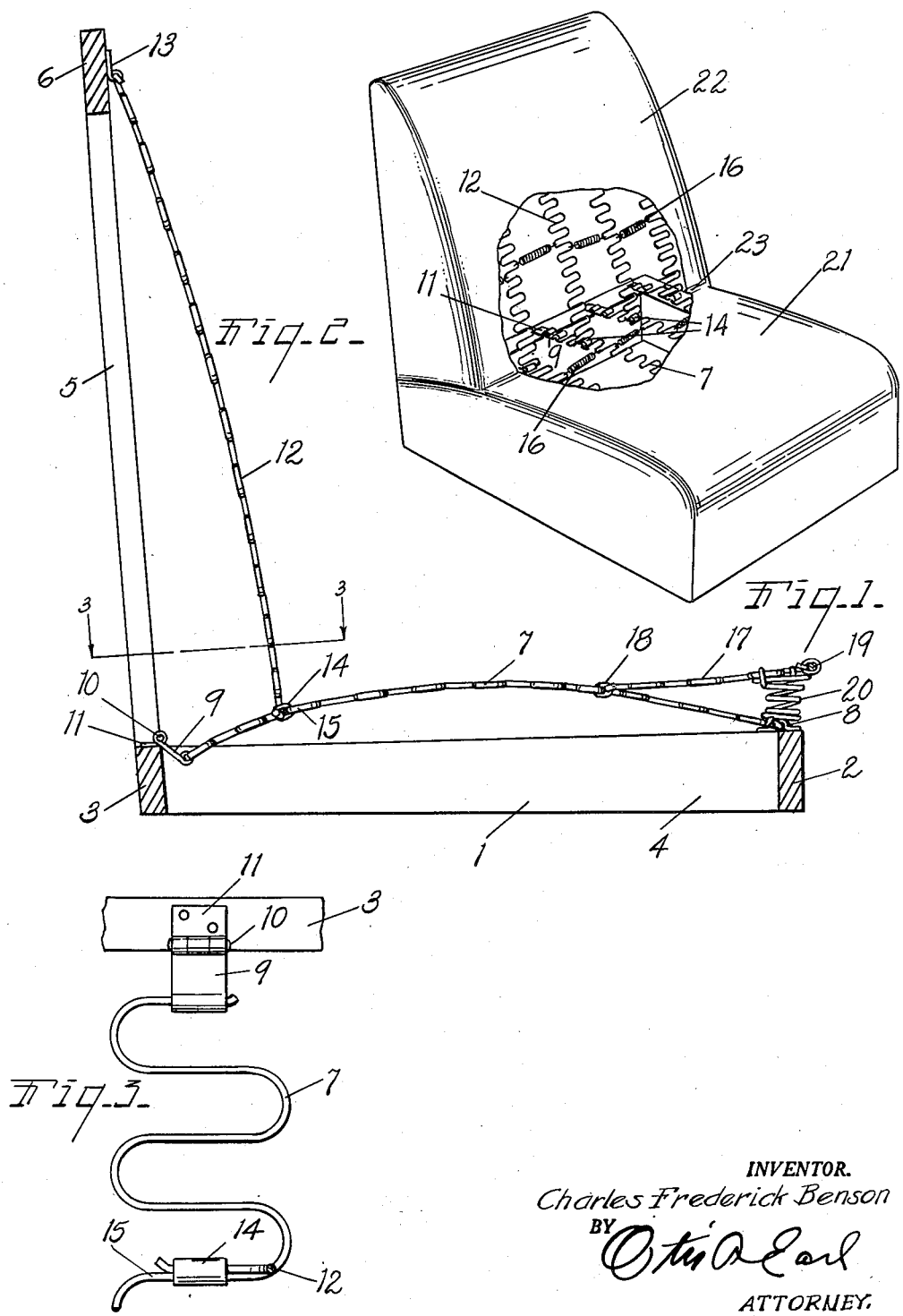
Dec. 5, 1950     C. F. BENSON     2,532,884
SPRING SEAT AND BACK STRUCTURE
Filed March 30, 1946
INVENTOR.
Charles Frederick Benson
ATTORNEY.

2,532,884

UNITED STATES PATENT OFFICE 2,532,884

SPRING SEAT AND BACK STRUCTURE

Charles Frederick Benson, Jackson, Mich.

Application March 30, 1946, Serial No. 658,465

7 Claims. (Cl. 155—179)

The main objects of this invention are:

First, to provide a combined spring seat and spring back structure which may be quite resilient and one in which relative movement of the seat and back at their point of juncture is substantially eliminated, thereby eliminating or minimizing the objectionable feature of sliding body movement of the occupant relative to the back.

Second, to provide a combined seat and back structure having relatively few parts and at the same time one in which the upholstery is effectively supported to attain the objects stated.

Third, to provide a combined seat and back spring structure utilizing the zigzag type of springs in both seat and back.

Objects pertaining to details and economies of the invention will definitely appear from the description to follow. The invention is defined in the claims.

A structure which embodies the features of the invention is clearly illustrated in the accompanying drawing, in which:

Fig. 1 is a perspective view of a single seat and back structure embodying the features of my invention, parts being shown conventionally and the upholstery being partially broken away to illustrate the relation of the seat and back springs.

Fig. 2 is an enlarged vertical section through the seat and back springs with the upholstery omitted.

Fig. 3 is an enlarged fragmentary view partially in section on line 3—3 of Fig. 2.

The embodiment of the invention illustrated is a front or single seat such as found in automobiles although the invention may be embodied in furniture. I have not illustrated the supports for the structure. The seat frame is designated generally by the numeral 1 and comprises a front member 2, rear member 3 and side members 4, only one of which is illustrated. The back frame comprises the uprights or side members 5 carried by the seat frame and connected at their upper ends by the top cross piece 6. The seat springs 7 are of the upwardly bowed zigzag type. The front ends of these springs are mounted on the upper edge of the member 2 of the seat frame by means of the clips 8. The rear ends of the seat springs are connected to the rear member 3 of the seat frame by means of the hinge links 9 which are pivoted at 10 to the hinge members 11 secured to the member 3. This permits swinging and some endwise movement of the seat springs as they are compressed under load.

The back springs 12 are also of the zigzag type and are secured at their upper ends by the clips 13 to the back top piece 6. Their lower ends are secured by the clips 14 to reaches 15 of the seat springs spaced forwardly from the rear ends of the seat springs. The back springs are forwardly bowed and also rearwardly inclined upwardly. The seat and back springs are connected by the helical tie springs 16.

It will be understood that in the accompanying drawing I have not attempted to show the exact number of seat and back springs that might be required; this would be varied not only according to the size of the structure but by other conditions such as the gauge of the wire from which the springs were formed, their length, and other factors.

In the embodiment illustrated the seat springs have front border springs 17 secured to reaches thereof at 18, the front ends of the springs 17 being connected by the border wire 19. The springs 17 are also of the zigzag type and they are provided to suitably support the seat upholstery at the front edge thereof. The front ends of the border springs are supported by the helically coiled springs 20.

The seat upholstery is conventionally illustrated, that is, no filling or padding material is illustrated. The seat covering section 21 and the back covering section 22 are formed integrally or are joined together at 23 so that, since the lower ends of the back springs move with the vertical movement of the seat springs under load, the back upholstery moves also, thereby avoiding frictional or sliding movement of the occupant on the back with the movement of the seat springs under load. This sliding movement of the occupant of the seat on the back is sometimes considerable, not only resulting in quite an unpleasant sensation but tending to wrinkle and displace the garments of the occupant. In seat structures where the cushion and back are quite independent there is a tendency for the garments of the occupant to work down and wedge between the rear edge of the seat and the lower end of the back cushion. This condition is obviated by structures embodying my invention.

I have not attempted to illustrate or describe various adaptations and embodiments of the invention which I contemplate as it is believed this disclosure will enable the adaptation of the invention as may be desired.

Having thus described my invention what I claim as new and desire to secure by Letters Patent is:

1. A combined seat and back structure comprising, in combination, a supporting frame including connected front and rear seat frame members and a back frame top member, a plurality of upwardly bowed zigzag seat springs arranged in spaced parallel relation and secured at their front ends to the front seat frame member, depending supporting links on the rear ends of said seat springs pivotally mounted on the rear seat frame member, a plurality of forwardly bowed zigzag longitudinally springable back springs alined with said seat springs and connected at their upper ends to said back frame top member and having their lower ends connected to reaches of said seat springs in substantially spaced relation to the rear ends thereof whereby the lower ends of the back springs are supported by and move in unison with the vertical movement of the seat springs, and upholstery for said springs secured to said supporting frame and consisting of seat and back upholstery cover sections supported by said seat and back springs, the lower end of said back upholstery cover section being connected to the rear end of the seat upholstery cover section, the union for said cover sections being adjacent the point of connection for the lower ends of the back springs to the seat springs.

2. A combined seat and back structure comprising, in combination, a supporting frame including connected front and rear seat frame members and a back frame top member, a plurality of upwardly bowed zigzag seat springs arranged in spaced parallel relation and secured at their front ends to the front seat frame member, depending supporting links on the rear ends of said seat springs pivotally mounted on the rear seat frame member, and a plurality of forwardly bowed zigzag longitudinally springable back springs alined with said seat springs and connected at their upper ends to said back frame top member and having their lower ends connected to reaches of said seat springs in substantially spaced relation to the rear ends thereof whereby the lower ends of the back springs are supported by and move in unison with the vertical movement of the seat springs.

3. In combination with a seat frame, a back frame extending upwardly from said seat frame, a plurality of upwardly bowed zigzag seat springs extending from front to rear of the seat frame and supported at their ends thereby, a plurality of forwardly bowed zigzag longitudinally springable back springs connected at their upper ends to said back frame and having their lower ends connected to reaches of said seat springs in substantially spaced relation to the point of attachment of the rear ends thereof to said seat frames so that the lower ends of the back springs are supported by and move in unison with the vertical movement of the seat springs, and upholstery for said springs secured to said seat frame and back frame and consisting of seat and back upholstery cover sections supported by said seat and back springs, the lower end of said back upholstery cover section being connected to the rear end of the seat upholstery cover section, the union of said cover sections being adjacent the point of connection of the lower ends of the back springs to the seat springs.

4. In combination with a seat frame, a back frame extending upwardly from said seat frame, a plurality of upwardly bowed zigzag seat springs extending from front to rear of the seat frame and supported at their ends thereby, and a plurality of forwardly bowed zigzag longitudinally springable back springs connected at their upper ends to said back frame and having their lower ends connected to reaches of said seat springs in substantially spaced relation to the point of support of the rear ends thereof whereby the lower ends of the back springs are supported by and move in unison with the vertical movement of the seat springs.

5. A seat and back structure comprising a seat frame, a back frame, a plurality of upwardly bowed zigzag seat springs supported at their ends on said seat frame, a plurality of vertically disposed forwardly bowed zigzag longitudinally springable back springs alined with said seat springs and having their lower ends connected to reaches of said seat springs in substantially spaced relation to the point of support of the rear ends thereof, the upper ends of said back springs being connected to said back frame in vertically spaced relation from the seat frame, and upholstery for said seat and back springs supported thereby whereby the relative movement of the seat and back upholstery is minimized.

6. A seat and back structure comprising a seat frame, a back frame, a plurality of upwardly bowed zigzag seat springs supported at their ends on said seat frame, a plurality of vertically disposed forwardly bowed zigzag longitudinally springable back springs having their lower ends connected to said seat springs in substantially spaced relation to the point of support of the rear ends thereof, the upper ends of said back springs being connected to said back frame in vertically spaced relation from the seat.

7. In a seat and back structure, a seat frame, a back frame, a plurality of upwardly bowed seat springs supported at their ends on said seat frame, a plurality of vertically disposed forwardly bowed longitudinally extensible back springs having their lower ends connected to said seat springs in substantially spaced relation to the point of support of the rear ends thereof, the upper ends of said back springs being connected to said back frame in vertically spaced relation from the seat frame, each of the back springs comprising a series of looped portions spaced longitudinally of the spring, with each looped portion extending transversely of the general direction of the spring, to facilitate longitudinal extension and compression of the spring.

CHARLES FREDERICK BENSON.

REFERENCES CITED

The following references are of record in the file of this patent:

UNITED STATES PATENTS

| Number | Name | Date |
|---|---|---|
| 2,169,705 | Mouw | Aug. 15, 1939 |
| 2,177,363 | Flint | Oct. 24, 1939 |

FOREIGN PATENTS

| Number | Country | Date |
|---|---|---|
| 1,773 | France | of 1903 |
| | (Addition of 322,009) | |
| 683,718 | Germany | of 1939 |
| 509,729 | Great Britain | of 1939 |